United States Patent
Zhao et al.

(10) Patent No.: US 11,815,973 B2
(45) Date of Patent: Nov. 14, 2023

(54) DATA RECEIVING AND TRANSMITTING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Qian Zhao, Shenzhen (CN); Zeyu Pang, Shenzhen (CN); Yachen Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 48 days.

(21) Appl. No.: 17/553,737

(22) Filed: Dec. 16, 2021

(65) Prior Publication Data
US 2022/0107677 A1    Apr. 7, 2022

Related U.S. Application Data

(63) Continuation of application No. PCT/CN2020/113177, filed on Sep. 3, 2020.

(30) Foreign Application Priority Data

Nov. 1, 2019  (CN) .......................... 201911058367.8

(51) Int. Cl.
*G06F 1/3209*   (2019.01)
(52) U.S. Cl.
CPC .................... *G06F 1/3209* (2013.01)
(58) Field of Classification Search
CPC .... G06F 1/3209; G06F 1/215; G06F 16/2255; H04L 67/12; H04L 45/74; H04W 52/0225; H04W 52/0248; H04W 76/28
(Continued)

(56) References Cited

U.S. PATENT DOCUMENTS 10,609,644 B2 *  3/2020  Fang ..................... H04W 16/14
10,757,652 B2    8/2020  Mudulodu et al.
(Continued)

FOREIGN PATENT DOCUMENTS

CN    106937369 A    7/2017
CN    109511158 A    3/2019
(Continued)

OTHER PUBLICATIONS

The World Intellectual Property Organization (WIPO) International Search Report for PCT/CN2020/113177 dated Nov. 25, 2020 5 Pages (including translation).
(Continued)

*Primary Examiner* — Chun Cao
(74) *Attorney, Agent, or Firm* — Anova Law Group, PLLC

(57) ABSTRACT

A data receiving method includes: receiving a destination address in a preamble segment; receiving a first duration and a second duration after the destination address in the preamble segment when the destination address is different from a local address, the first duration being a remaining duration before a beginning of transmission of valid data, and the second duration being a duration required for transmitting the valid data; determining a dormant duration according to the first duration and the second duration, and controlling a local device to enter a low power mode; and waking up the local device after a duration in the low power mode reaches the dormant duration.

20 Claims, 7 Drawing Sheets

(58) Field of Classification Search
USPC .......................................................... 713/323
See application file for complete search history.

(56) References Cited

U.S. PATENT DOCUMENTS

| | | | |
|---|---|---|---|
| 10,778,389 | B2 | 9/2020 | Yang et al. |
| 2009/0103564 | A1 | 4/2009 | Lee et al. |
| 2011/0134818 | A1 | 6/2011 | Bae et al. |
| 2016/0366644 | A1* | 12/2016 | Ghosh ............... H04W 52/0235 |
| 2018/0352536 | A1 | 12/2018 | Hall et al. |
| 2019/0116555 | A1* | 4/2019 | Kristem ............. H04L 27/2605 |
| 2019/0320602 | A1* | 10/2019 | Doehling ............. A01G 27/003 |

FOREIGN PATENT DOCUMENTS

| | | | | |
|---|---|---|---|---|
| CN | 109600824 | A | | 4/2019 |
| CN | 110351062 | A | | 10/2019 |
| CN | 110798881 | A | | 2/2020 |
| CN | 109511158 | | * 3/2022 | ........ H04W 52/0229 |
| WO | 2019118944 | A1 | | 6/2019 |

OTHER PUBLICATIONS

The State Intellectual Property Office of the People's Republic of China (SIPO) Office Action 1 for for 201911058367.8 dated Mar. 25, 2021 10 Pages (including translation).
The State Intellectual Property Office of the People's Republic of China (SIPO) Office Action 2 for for 201911058367.8 dated Sep. 7, 2021 9 Pages (including translation).

* cited by examiner

DATA RECEIVING AND TRANSMITTING METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2020/113177, filed on Sep. 3, 2020, which claims priority to Chinese Patent Application No. 2019110583678, filed on Nov. 1, 2019 and entitled "DATA RECEIVING AND TRANSMITTING METHOD AND APPARATUS, COMPUTER DEVICE, AND STORAGE MEDIUM", the entire contents of both of which are incorporated herein by reference.

FIELD OF THE TECHNOLOGY

The present disclosure relates to the field of computer technologies, and to the field of Internet of Things (IoT) technologies, and in particular, to a data receiving and transmitting method and apparatus, a computer device, and a storage medium.

BACKGROUND OF THE DISCLOSURE

With rapid development of science and technology, data transmitted by using a network is applied to various data transmission scenarios, for example, data transmission in an IoT scenario.

In a conventional method, in some data transmission scenarios, a plurality of devices exist. Before data transmission, each device is periodically switched back and forth between a low power mode and a channel activity detection (CAD) mode. During an entire process of transmitting data to a destination device, other non-destination devices still periodically switch back and forth between the low power mode and the CAD mode, thereby periodically entering the CAD mode. However, energy consumption of the CAD mode is greater than that of the low power mode, resulting in unnecessary energy consumption of the non-destination devices.

SUMMARY

According to various embodiments provided in the present disclosure, a data receiving method and apparatus, a computer device, and a storage medium are provided. In addition, a data transmitting method and apparatus, a computer device, and a storage medium are further provided.

According to an aspect of the present disclosure, a data receiving method is provided, performed by a computer device, including: receiving a destination address in a preamble segment; receiving a first duration and a second duration after the destination address in the preamble segment when the destination address is different from a local address, the first duration being a remaining duration before a beginning of transmission of valid data, and the second duration being a duration required for transmitting the valid data; determining a dormant duration according to the first duration and the second duration, and controlling a local device to enter a low power mode; and waking up the local device after a duration in the low power mode reaches the dormant duration.

According to an aspect of the present disclosure, a data receiving apparatus is provided, disposed in a computer device, including: a receiving module, configured to receive a destination address in a preamble segment, the preamble segment being located before valid data; receive a first duration and a second duration after the destination address in the preamble segment when the destination address is different from a local address, the first duration being remaining a duration before the beginning of transmission of the valid data, and the second duration being a duration required for transmitting the valid data; a dormant module, configured to: determine a dormant duration according to the first duration and the second duration, and control a local device to enter a low power mode; and a wakeup module, configured to wake up the local device after a duration in the low power mode reaches the dormant duration.

According to an aspect of the present disclosure, a computer device is provided, including a memory and one or more processors, where the memory stores computer-readable instructions, when executed by the one or more processors, causing the one or more processors to perform: receiving a destination address in a preamble segment; receiving a first duration and a second duration after the destination address in the preamble segment when the destination address is different from a local address, the first duration being a remaining duration before a beginning of transmission of valid data, and the second duration being a duration required for transmitting the valid data; determining a dormant duration according to the first duration and the second duration, and controlling a local device to enter a low power mode; and waking up the local device after a duration in the low power mode reaches the dormant duration.

According to an aspect of the present disclosure, one or more non-transitory computer-readable storage media are provided, storing computer-readable instructions, when executed by one or more processors, causing the one or more processors to perform: receiving a destination address in a preamble segment; receiving a first duration and a second duration after the destination address in the preamble segment when the destination address is different from a local address, the first duration being a remaining duration before a beginning of transmission of valid data, and the second duration being a duration required for transmitting the valid data; determining a dormant duration according to the first duration and the second duration, and controlling a local device to enter a low power mode; and waking up the local device after a duration in the low power mode reaches the dormant duration.

Details of one or more embodiments of the present disclosure are provided in the subsequent accompanying drawings and descriptions. Based on the specification, the accompanying drawings, and the claims of the present disclosure, other features, objectives, and advantages of the present disclosure become more obvious.

BRIEF DESCRIPTION OF THE DRAWINGS

To describe the technical solutions in embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other accompanying drawings from these accompanying drawings without creative efforts.

DESCRIPTION OF EMBODIMENTS

To make the objectives, technical solutions, and advantages of the present disclosure clearer and more understandable, the present disclosure is further described in detail below with reference to the accompanying drawings and the embodiments. It is to be understood that the specific embodiments described herein are merely used to explain the present disclosure but are not intended to limit the present disclosure.

Figure 1:
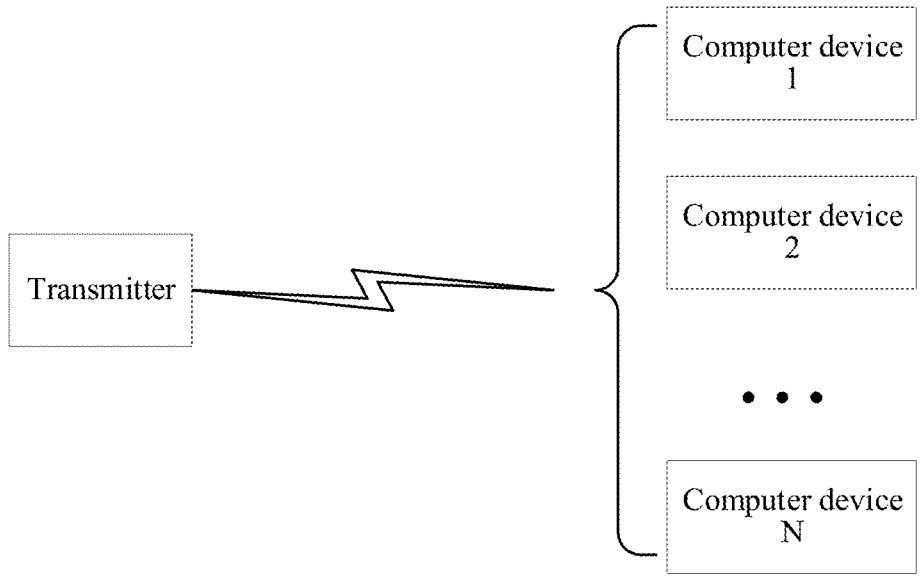
FIG. 1 is an application scenario diagram of a data receiving method according to an embodiment.

FIG. 1 is an application scenario diagram of a data receiving method according to an embodiment. Referring to FIG. 1, the application scenario includes a transmitter 110 and at least one computer device 120. The transmitter 110 is a device for transmitting a signal, and is configured to transmit valid data by transmitting a signal. The computer device 120 is configured to receive the signal transmitted by the transmitter 110. The computer device 120 may include at least one of a smart television, a smart speaker, a desktop computer, a mobile terminal, or the like. The mobile terminal may include at least one of a mobile phone, a tablet computer, a notebook computer, a personal digital assistant, a wearable device, or the like.

It may be understood that the signal transmitted by the transmitter 110 includes at least one preamble segment and valid data, and the preamble segment is located before the valid data. Each preamble segment sequentially includes a destination address, first duration, and second duration, in sequence. The first duration is remaining duration before the beginning of transmission of the valid data, and the second duration is duration required for transmitting the valid data.

It may be understood that each computer device 120 determines, by using the preamble segment, whether the computer device 120 is a destination device; if the computer device 120 is the destination device, the computer device 120 can receive the valid data; or if the computer device 120 is a non-destination device, the computer device 120 will not receive the valid data.

When receiving the destination address in the preamble segment, each computer device 120 determines whether the destination address is the same as a local address of the computer device 120. The computer device 120 receives the first duration and the second duration after the destination address in the preamble segment when the destination address is different from the local address, the first duration being the remaining duration before the beginning of transmission of the valid data, and the second duration being the duration required for transmitting the valid data. The computer device 120 determines dormant duration according to the first duration and the second duration, and controls a local device to enter a low power mode; and wakes up the local device after duration in the low power mode reaches the dormant duration.

It may be understood that, in an embodiment, the computer device 120 in FIG. 1 may include an IoT device. A specific application process may be shown in FIG. 2. An IoT device 130 in FIG. 2 is a computer device configured to implement the data receiving method in the embodiments of the present disclosure.

IoT is an information carrier such as the Internet and a conventional telecommunications network, so that all ordinary objects that can perform independent functions implement interconnection and interworking. The IoT device is a device that can implement interconnection and interworking based on IoT.

In an embodiment, the IoT device may include at least one of a sensor, an intelligent door lock, or the like.

Figure 2:
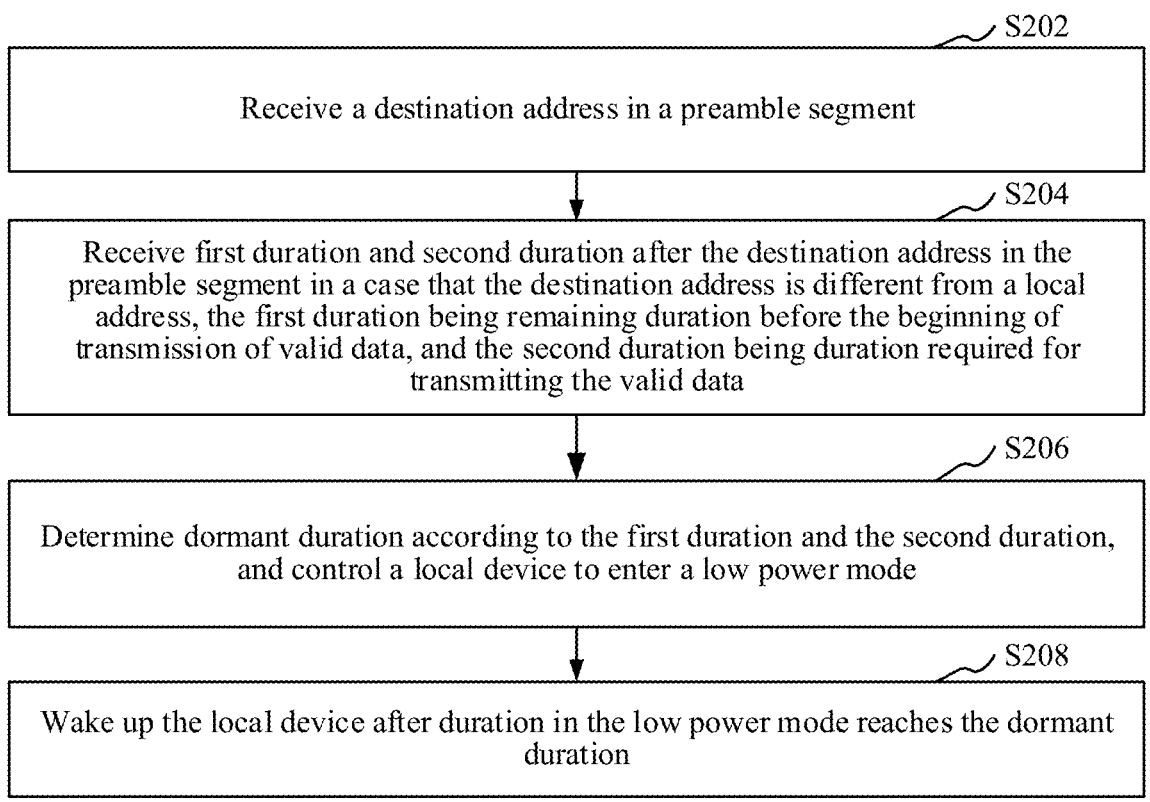
FIG. 2 is a schematic flowchart of a data receiving method according to an embodiment.

FIG. 2 is a schematic flowchart of a data receiving method according to an embodiment. The data receiving method in this embodiment may be applied to a computer device. Currently, the computer device 120 in FIG. 1 is mainly used as an example for description. Referring to FIG. 2, the method specifically includes the following steps:

S202. Receive a destination address in a preamble segment.

The preamble segment is data located before valid data. The preamble segment is a segment in a preamble. The preamble may include at least one preamble segment. The valid data is substantive instruction data used for controlling the computer device. The destination address is an address of a destination device to which the valid data is to be transmitted.

It may be understood that the preamble segment cannot notify the computer device of specific instruction data. That is, the computer device cannot learn of a specific instruction after receiving the preamble segment, and can learn of the specific instruction only after subsequently receiving the valid data.

Before receiving the preamble segment, the computer device periodically switches between a low power mode and a CAD mode.

A transmitter may sequentially transmit the preamble segment and the valid data. The preamble segment includes the destination address. Each computer device may first receive the destination address in the preamble segment, and determine whether the destination address in the preamble segment is the same as a local address of the computer device.

It may be understood that, if the destination address in the preamble segment is different from the local address, it indicates that the computer device is not a destination device; or if the destination address in the preamble segment is the same as the local address, it indicates that the computer device is the destination device. Ultimately, the destination device receives the subsequently transmitted valid data.

In an embodiment, both the local device of the computer device and the destination device are IoT devices. The valid data is instruction data used for controlling at least one of the IoT devices. The preamble segment is data located before the valid data.

In an embodiment, the preamble segment and the valid data are transmitted by the transmitter based on a long range (LoRa) technology.

In an embodiment, the computer device receives the destination address in the preamble segment in a CAD mode of a current period. The CAD mode is used for detecting a preamble in a signal. It may be understood that energy consumption in the CAD mode is greater than that in the low power mode. A preamble can be received in the CAD mode.

S204. Receive first duration and second duration after the destination address in the preamble segment when the destination address is different from a local address, the first duration being remaining duration before the beginning of transmission of valid data, and the second duration being duration required for transmitting the valid data.

It may be understood that, in addition to the destination address, the preamble segment further includes the first duration and the second duration after the destination address. The first duration is remaining duration before the transmitter starts to transmit the valid data to the destination device. That is, it is used for representing how long it will take before the valid data starts to be transmitted. The valid data needs to experience a specific period of time from the beginning of transmission to final successful transmission to the destination device. Therefore, the second duration refers to duration required from the beginning of transmission of the valid data to complete transmission of the valid data.

Second duration is after first duration in the same preamble segment.

Figure 3:
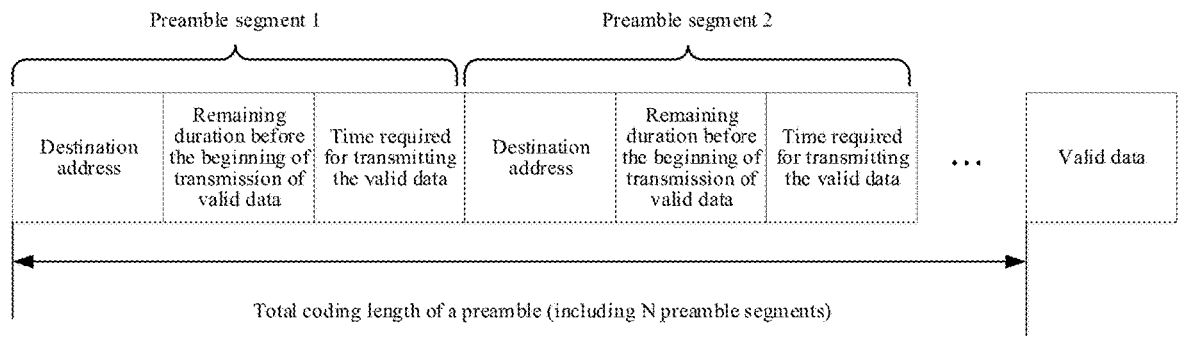
FIG. 3 is a schematic structural diagram of a preamble segment according to an embodiment.

To better understand a structure of the preamble segment, reference may be made to FIG. 3 for schematic description. Referring to FIG. 3, the preamble segment includes a destination address, remaining duration (or remaining time, that is, the first duration) before the beginning of transmission of valid data, and duration required for transmitting the valid data (that is, the second duration). At least one preamble segment forms a preamble. The valid data is transmitted after the preamble segment. As shown in FIG. 3, the transmitter transmits the preamble segment before transmitting the valid data. It may be understood that, from the first preamble segment to the last preamble segment, first duration between preamble segments is successively decremented. In an embodiment, the first duration between the preamble segments is successively decremented in a form of arithmetic progression. In the same preamble segment, the transmitter successively transmits the destination address, the first duration, and the second duration. Therefore, the computer device also successively receives the destination address, the first duration, and the second duration.

Specifically, when the destination address is different from the local address of the computer device, it indicates that the computer device is not the destination device, and the computer device may successively receive the first duration and the second duration after the destination address in the preamble segment.

S206. Determine dormant duration according to the first duration and the second duration, and control a local device to enter a low power mode.

The low power mode refers to a dormant state. In the low power mode, energy consumption is extremely low, and a signal cannot be detected. It may be understood that energy consumption of the CAD mode is between that of the low power mode and that of a working mode.

Specifically, the computer device may acquire the dormant duration according to the sum of the first duration and the second duration, and control the local device to enter the low power mode. It may be understood that the dormant duration is used for representing duration in the low power mode. The computer device may set a wakeup timer according to the dormant duration. When the dormant duration is reached, the local device can be woken up by the wakeup timer. The computer device is always in the low power mode until woken up by the wakeup timer. The wakeup timer is a timer used for waking up a device.

S208. Wake up the local device after duration in the low power mode reaches the dormant duration.

Specifically, after the duration in the low power mode reaches the dormant duration, the computer device may wake up the local device by using the wakeup timer.

In an embodiment, after waking up the local device, the computer device may enter the CAD mode.

Figure 4:
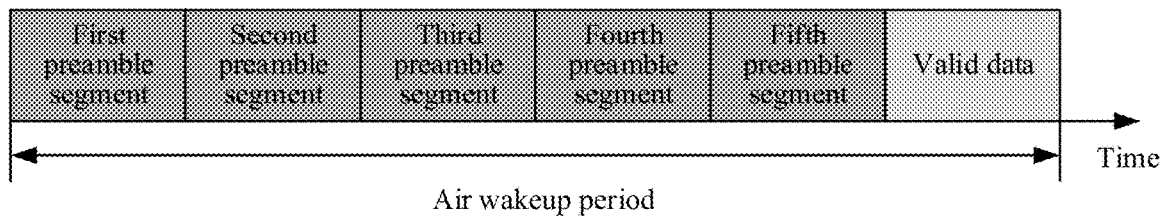
FIG. 4 is a schematic diagram of data transmission according to an embodiment.

For ease of understanding, exemplary descriptions are provided with reference to FIG. 4. FIG. 4 is a schematic diagram of data transmission according to an embodiment. Referring to FIG. 4, there are five preamble segments. Each of the five preamble segments carries the same destination address and second duration (that is, duration required for transmitting valid data). In addition, first duration carried in the first preamble segment (that is, remaining duration before the beginning of transmission of the valid data) is 4 seconds, first duration carried in the second preamble segment is 3 seconds, first duration carried in the third preamble segment is 2 seconds, first duration carried in the fourth preamble segment is 1 second, first duration carried in the fifth preamble segment is 0 seconds, and the fifth preamble segment is followed by the valid data. When a LoRa transmitter needs to transmit the valid data to a LoRa receiver (that is, the computer device), the LoRa transmitter first transmits the five preamble segments to the LoRa receiver. When the LoRa transmitter transmits the first preamble segment, the LoRa receiver is in a dormant state. When the LoRa transmitter transmits the second preamble segment, the LoRa receiver just wakes up from a 6-second low power mode (that is, the dormant state), the LoRa receiver parses a destination address in the second preamble segment, determines whether the valid data is to be received by the LoRa receiver itself, and if the LoRa receiver is not to receive the valid data (that is, the local device of the LoRa receiver is a non-destination device), the LoRa receiver immediately parses the sum of the first duration and the second duration in the second preamble segment. It is assumed that the sum is 18 seconds. Then, the LoRa receiver sets an 18-second wakeup timer by using a real-time clock (RTC), and then the LoRa receiver enters the low power mode. Then, the LoRa receiver is woken up 18 seconds later by the wakeup timer and enters the CAD mode to continue to detect whether a preamble is transmitted. If no preamble is transmitted, the LoRa receiver enters a next 6-second low power mode, so as to recover periodic switching between the low power mode and the CAD mode, and implement switching between the dormant and awake states. It may be understood that the LoRa receiver is in the low power mode in 18 seconds, and does not switch back and forth between the low power mode and the CAD mode as in the conventional method. In this period, power consumption generated when the LoRa receiver enters the CAD mode is reduced. It may be understood that a transmission time from the first preamble segment to the valid data in FIG. 4 may be referred to as an air wakeup period, and a total preamble length may be set to an integer multiple of the air wakeup period, so as to avoid missing data transmitted by the transmitter and reduce a probability of missing the valid data.

According to the foregoing data receiving method, when a destination address in a preamble segment received by a receiving device is different from a local address, a local device is controlled to enter a low power mode according to dormant duration determined according to remaining duration before the beginning of transmission of valid data (i.e., a duration from current time until a scheduled time to start the transmission of valid data) and duration required for transmitting the valid data in the preamble segment, so that when the local device is not a destination device, before the valid data is fully transmitted to the destination device, the local device is always in the low power mode until duration in the low power mode reaches the dormant duration and then the local device is woken up. Therefore, the local device does not need to continue to wake up periodically, thereby avoiding and reducing energy consumption caused by periodically waking up to enter a CAD mode.

In an embodiment, the method further includes: controlling, when the destination address is the same as the local address, the local device to enter the low power mode in response to receiving the first duration; and waking up, when the duration in the low power mode reaches the first duration, the local device to receive the valid data transmitted after the preamble segment.

Second duration is after first duration in the same preamble segment.

It may be understood that when the destination address is the same as the local address, it indicates that the computer device is the destination device. In this case, the computer device may control, immediately after receiving the first duration, the local device to enter the low power mode without receiving the second duration, because receiving the second duration is meaningless to the destination device. Therefore, unnecessary energy consumption caused by receiving the second duration is avoided, and resources are saved.

Specifically, the computer device may set a wakeup timer according to the first duration. When the duration in the low power mode reaches the first duration, it indicates that the valid data is transmitted. In this case, the local device may be woken up by using the wakeup timer to receive the transmitted valid data. It may be understood that the computer device may wake up the local device to enter the working mode by using the wakeup timer, so as to receive the transmitted valid data in the working mode.

In an embodiment, the receiving a destination address in a preamble segment in step S202 includes: receiving the destination address in the preamble segment in a CAD mode. The waking up, when the duration in the low power mode reaches the first duration, the local device to receive the valid data transmitted after the preamble segment includes: waking up, when the duration in the low power mode reaches the first duration, the local device to enter a working mode to receive the transmitted valid data.

It may be understood that when in the CAD mode, the computer device can detect the preamble segment and can receive the destination address in the preamble segment. However, because energy consumption of the CAD mode is between that of the low power mode and that of the working mode, when the duration in the low power mode reaches the first duration, the local device is woken up to enter the working mode and receive the transmitted valid data in the working mode, so that the valid data is successfully transmitted to the computer device.

Another example is also described with reference to FIG. 4. If the LoRa receiver determines, by parsing the destination address in the second preamble segment, that the valid data is to be received by the LoRa receiver (that is, the local device of the LoRa receiver is the destination device), the LoRa receiver parses the first duration, namely 3 seconds, in the second preamble segment. The LoRa receiver uses the RTC to set a 3-second wakeup timer. Then, the LoRa receiver becomes dormant for 3 seconds and then is woken up by the wakeup timer to enter the working mode and start to receive the valid data. It may be understood that the LoRa receiver is in a low power mode of 3-second duration, thereby reducing receiving power consumption in the 3-second duration.

In the foregoing embodiment, when the computer device is the destination device, in response to receiving the first duration, the local device is controlled to enter the low power mode without consuming energy to receive the second duration, thereby reducing energy consumption. When the duration in the low power mode reaches the first duration, the local device is woken up to receive the valid data transmitted after the preamble segment. Energy consumption before the valid data arrives is avoided.

In an embodiment, the receiving the destination address in the preamble segment in a CAD mode includes: receiving the destination address in the preamble segment in a CAD mode of a current period, the same period including a CAD mode and a low power mode. In other words, one period includes a subperiod corresponding to the CAD mode and a subperiod corresponding to the low power mode. For one target period, its subperiod corresponding to the CAD mode may be referred to as the CAD mode of the target period, and its subperiod corresponding to the low power mode may be referred to as the low power mode of the target period. The method further includes: entering, when the destination address is different from the local address, a CAD mode of a next period after the local device is woken up; and entering, when the destination address is the same as the local address, the CAD mode of the next period after the valid data is successfully transmitted to the local device.

It may be understood that, before data transmission, the computer device may periodically switch between the CAD mode and the low power mode.

In this case, the computer device may receive the destination address in the preamble segment in the CAD mode of the current period. When the destination address is different from the local address, steps S204-S208 are performed. After the local device is woken up, the CAD mode of the next period is entered. When the destination address is the same as the local address, the local device is controlled to enter the low power mode in response to receiving the first duration; and when the duration in the low power mode reaches the first duration, the local device is woken up to enter the working mode to receive the transmitted valid data, and enter the CAD mode of the next period after the valid data is successfully transmitted to the local device.

Figure 5:
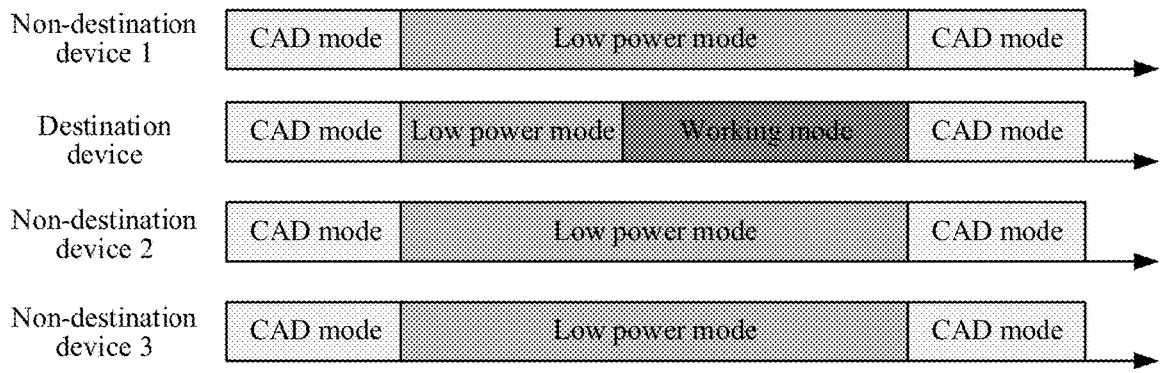
FIG. 5 and FIG. 6 are schematic diagrams of statuses of a destination device and a non-destination device according to an embodiment.
Figure 6:
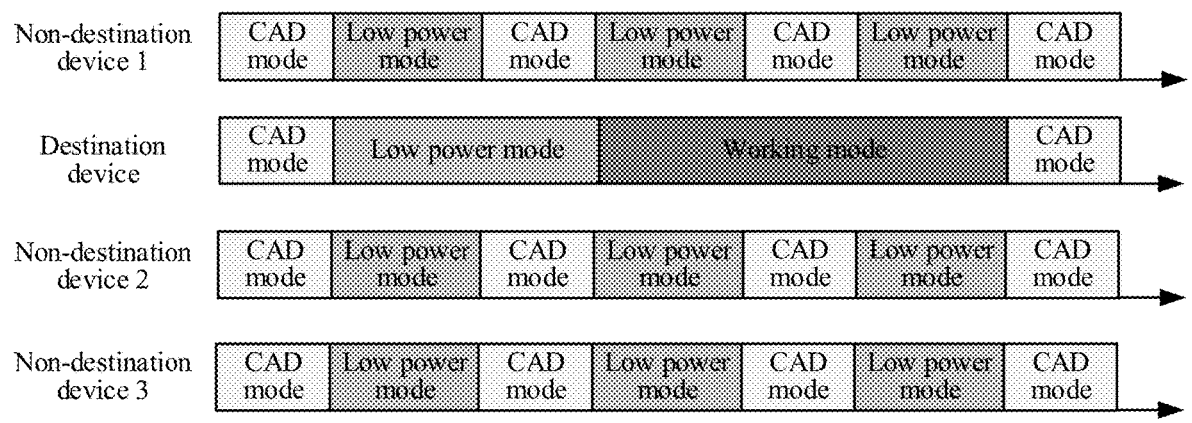

For ease of understanding, FIG. 5 and FIG. 6 are used as examples for description. FIG. 5 and FIG. 6 are schematic diagrams of statuses of a destination device and a non-destination device according to an embodiment. FIG. 5 shows a schematic diagram of statues of a destination device and a non-destination device according to a data receiving method in an embodiment of the present disclosure. Both the destination device and the non-destination device receive a preamble segment in a CAD mode of a current period. The destination device is in a low power mode in first duration. After duration in the low power mode reaches the first duration, the destination device wakes up the local device to enter a working mode to receive valid data, and enters a CAD mode of a next period after the valid data is received. Other non-destination devices 1 to 3 determine dormant duration according to the first duration and second duration.

During the dormant duration, the non-destination devices 1 to 3 are in the low power mode. After duration in the low power mode reaches the dormant duration, the non-destination devices 1 to 3 wake up local devices to enter a CAD mode of a next period.

FIG. 6 is a schematic diagram of statuses of a destination device and a non-destination device in a conventional method. Referring to FIG. 6, both the destination device and the non-destination device receive a preamble segment in a CAD mode of a current period. The destination device is in a low power mode in first duration. After duration in the low power mode reaches the first duration, the destination device wakes up the local device to enter a working mode to receive valid data, and enters a CAD mode of a next period after the valid data is received. Other non-destination devices 1 to 3 continue to periodically switch between the low power mode and the CAD mode. It may be learned from FIG. 6 that in a complete process of receiving the valid data by the destination device, the non-destination devices enter the CAD mode one or more times. In this case, unnecessary energy consumption is caused due to unnecessary entry into the CAD mode.

Figure 7:
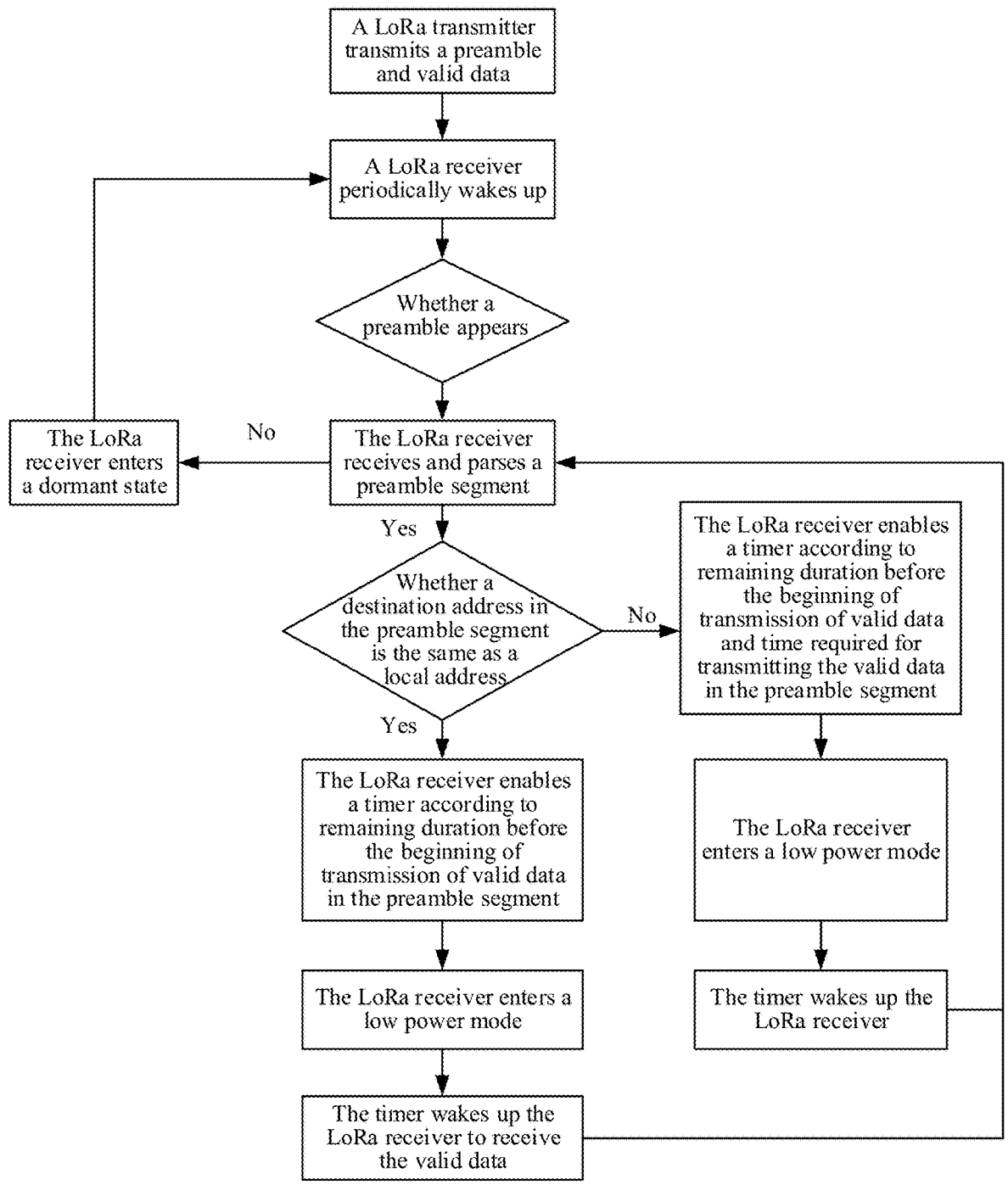
FIG. 7 is a simplified flowchart of a data receiving method according to an embodiment.

FIG. 7 is a simplified flowchart of a data receiving method according to an embodiment. FIG. 7 is described by using a LoRa transmitter (a transmitter based on a LoRa technology, where the LoRa technology is a long-distance spread spectrum modulation technology) and a LoRa receiver as examples. Referring to FIG. 7, the LoRa transmitter transmits a preamble and valid data, and the LoRa receiver periodically wakes up to enter a CAD mode and determines whether a preamble appears. If a preamble appears, the LoRa receiver receives and parses a preamble segment, and determines whether a destination address in the preamble segment is the same as a local address of the LoRa receiver. If the destination address in the preamble segment is the same as the local address of the LoRa receiver, the LoRa receiver enables a timer according to remaining duration before the beginning of transmission of the valid data (that is, first duration) in the preamble segment, and enters a low power mode. The timer wakes up the LoRa receiver to receive the valid data. After receiving the valid data, the LoRa receiver enters a CAD mode of a next period to determine whether a preamble appears. If the destination address in the preamble segment is not the same as the local address of the LoRa receiver, the LoRa receiver enables the timer according to the remaining duration before the beginning of transmission of the valid data (that is, the first duration) in the preamble segment, and time required for transmitting the valid data (that is, second duration), and enters the low power mode. When duration in the low power mode reaches the sum of the first duration and the second duration, the timer wakes up the LoRa receiver. If no preamble appears, the LoRa receiver enters a dormant state (that is, enters the low power mode) and continues to periodically wake up (that is, periodically switch between the CAD mode and the low power mode). It may be understood that the transmitter is a device for transmitting a signal, and the receiver is a receiving device (a computer device for receiving a signal).

In the foregoing embodiment, the non-destination device enters a CAD mode of a next period after waking up the local device according to the dormant duration. After the valid data is successfully transmitted to the local device, the destination device enters the CAD mode of the next period, so as to ensure that the destination device and the non-destination device simultaneously enter the CAD mode of the next period to detect a next preamble. In this way, data transmitted by the transmitter can be prevented from being omitted, so that the next preamble can reach the receiver earlier, signal transmitting efficiency is improved, and network congestion is reduced. Further, the receiver can earlier determine, according to the preamble, time for entering the low power mode, thereby reducing unnecessary energy consumption.

In an embodiment, the preamble segment is a segment in a preamble; the preamble includes a plurality of consecutive preamble segments; each preamble segment sequentially includes a segment spacing symbol, a destination address coding symbol, a first duration coding symbol, and a second duration coding symbol; and the segment spacing symbol is used for separating a current preamble segment in which the segment spacing symbol is located from a preceding preamble segment (e.g., a preamble segment immediately preceding the current preamble segment).

It may be understood that the preamble segment is a segment in a preamble. The preamble may include a plurality of consecutive preamble segments. The preamble segment is acquired through symbol coding. Each preamble segment sequentially includes a segment spacing symbol, a destination address coding symbol, a first duration coding symbol, and a second duration coding symbol. The "plurality of" in the embodiments of the present disclosure is at least two.

The segment spacing symbol is used for separating a preamble segment in which the segment spacing symbol is located from a previous preamble segment, that is, separate two preamble segments. It may be understood that the segment spacing symbol may be a single symbol, or may be a group of symbols.

The destination address coding symbol is a symbol used for coding a destination address. Similarly, the first duration coding symbol and the second duration coding symbol are respectively used for coding the first duration and the second duration. The destination address coding symbol, the first duration coding symbol, and the second duration coding symbol each may be a single symbol or a group of symbols.

In an embodiment, the preamble segment may be coded by using a binary symbol. Therefore, the segment spacing symbol, the destination address coding symbol, the first duration coding symbol, and the second duration coding symbol are all binary symbols.

In the foregoing embodiment, different preamble segments are separated by using regular segment spacing symbols, so that destination addresses in the preamble segments can be determined more quickly and accurately.

In an embodiment, the receiving a destination address in a preamble segment in step S202 includes: recording, starting from a coding symbol next to the segment spacing symbol when the segment spacing symbol is received, a coding symbol that meets a preset symbol quantity, to acquire a destination address coding symbol; and decoding the destination address coding symbol to acquire the destination address in the preamble segment.

It may be understood that the destination address coding symbol has a corresponding preset symbol quantity, that is, a quantity of coding symbol bits is preset for the destination address coding symbol. Therefore, when the segment spacing symbol is received, the computer device may determine that the segment spacing symbol is adjacent to the destination address coding symbol. Therefore, the computer device may record the coding symbol starting from the next coding symbol until the recorded coding symbol meets the preset symbol quantity, and the recorded coding symbol is the destination address coding symbol. For example, if the preset symbol quantity is 8, eight coding symbols are continuously recorded starting from the first coding symbol after the segment spacing symbol to acquire the destination address coding symbols.

It may be understood that both the first duration coding symbol and the second duration coding symbol have respective corresponding symbol quantities. Symbol quantities corresponding to the destination address coding symbol, the first duration coding symbol, and the second duration coding symbol may be the same or different. In this case, when the first duration and the second duration are acquired, the computer device may record, starting from a next coding symbol of the last symbol of the destination address coding symbol, the coding symbol that meets the symbol quantity corresponding to the first duration, to acquire the first duration coding symbol, and decode the first duration coding symbol to acquire the first duration. The computer device may record, starting from the next coding symbol of the last symbol of the first duration coding symbol, the coding symbol that meets the symbol quantity corresponding to the second duration, to acquire the second duration coding symbol, and decode the second duration coding symbol to acquire the second duration.

For example, the symbol quantity corresponding to the first duration is 6, and the symbol quantity corresponding to the second duration is 10. In this case, starting from the next coding symbol of the last symbol of the destination address coding symbol, six coding symbols are continuously recorded to acquire the first duration coding symbols. Starting from the next coding symbol of the last coding symbol of the first duration coding symbol, 10 coding symbols are recorded to acquire the second duration coding symbols.

In an embodiment, the segment spacing symbol, the destination address coding symbol, the first duration coding symbol, and the second duration coding symbol are different data groups with the same symbol quantity. That is, the same preamble segment may be divided into four groups: a segment spacing symbol, a destination address coding symbol, a first duration coding symbol, and a second duration coding symbol. In addition, each group of data has the same quantity of symbols. For example, each group of data includes binary symbols of the same bit quantity.

In the foregoing embodiment, a destination address in a preamble segment can be located more quickly and accurately by using a regular segment spacing symbol and a preset symbol quantity.

In an embodiment, data groups in different preamble segments have the same symbol quantity. That is, an entire preamble (including all preamble segments) is averagely grouped according to the preset symbol quantity, and each preamble segment includes four groups: a segment spacing symbol, a destination address coding symbol, a first duration coding symbol, and a second duration coding symbol. In this way, coding accuracy and efficiency can be improved. It may be understood that in another embodiment, data groups in different preamble segments may also have different symbol quantities.

In an embodiment, the segment spacing symbol includes a preset quantity of consecutive coding symbol pairs.

It may be understood that the segment spacing symbol may include a preset quantity of consecutive coding symbol pairs. For example, the segment spacing symbol may be "10101010" and includes four consecutive "10" pairs (that is, "10" is a coding symbol pair, and there are four pairs of "10"). The preset quantity of consecutive coding symbol pairs may alternatively be only a part of the segment spacing symbol, that is, the segment spacing symbol may be an irregular combination of a fixed coding symbol and the preset quantity of consecutive coding symbols. For example, the segment spacing symbol may be "0010101010", that is, an irregular combination of a fixed coding symbol "00" and four consecutive "10" pairs. It may be understood that a specific structural form of the segment spacing symbol is not limited, provided that the segment spacing symbol can be identified to separate different preamble segments.

In an embodiment, the recording, starting from a coding symbol next to the segment spacing symbol when the segment spacing symbol is received, a coding symbol that meets a preset symbol quantity, to acquire a destination address coding symbol includes: recording, when the preset quantity of consecutive coding symbol pairs are received, an initial data group after the last/latest coding symbol pair to acquire the destination address coding symbol.

It may be understood that the segment spacing symbol, the destination address coding symbol, the first duration coding symbol, and the second duration coding symbol are data groups with the same symbol quantity. The destination address coding symbol is a data group adjacent to the segment spacing symbol. Therefore, when continuously receiving the preset quantity of coding symbol pairs, indicating that a complete segment spacing symbol is received, the computer device may determine that the subsequent first data group is the destination address coding symbol, and therefore record the initial data group after the last coding symbol pair, to acquire the destination address coding symbol. For example, if the preset quantity of consecutive coding symbol pairs is four "10" pairs, the initial data group (that is, the first group of data) may be recorded when four consecutive "10" pairs are received, so as to acquire the destination address coding symbol.

In the foregoing embodiment, it is assumed that a single coding symbol or a single coding symbol pair is used as a segment spacing symbol. A case that a single coding symbol or coding symbol pair is also present in another data group other than the segment spacing symbol is prone to occur, thereby causing confusion, and further causing a problem of inaccurate detection. Therefore, when the preset quantity of consecutive coding symbol pairs is received, the initial data group after the last coding symbol pair is recorded, which does not easily confuse the segment spacing symbol with other data. Therefore, detection accuracy is improved, and data in a preamble can be more accurately detected and received.

It may be understood that when the destination address acquired by decoding the destination address coding symbol in the initial data group is different from the local address, the computer device determines that the valid data is not to be transmitted to the computer device, and the computer device may record two following data groups (that is, record two data groups after the first data group), so as to acquire the first duration and the second duration by decoding the first duration coding symbol and the second duration coding symbol in the two following data groups, sum up the first duration and the second duration to acquire the dormant duration, and control the local device to be in the low power mode in the dormant duration. When the duration in the low power mode reaches the dormant duration, the local device is woken up to enter the CAD mode of the next period, so as to detect a next preamble, and continue to periodically switch between the CAD mode and the low power mode.

When the destination address acquired by decoding the destination address coding symbol in the initial data group is the same as the local address, the computer device determines that the valid data is to be transmitted to the computer device, and the computer device may record a data group after the initial data group (that is, record the second data group after the last coding symbol pair) to acquire the first duration coding symbol from the data group, and acquire the first duration through decoding; and control the local device to be in the low power mode in the first duration. When the duration in the low power mode reaches the first duration, the local device is woken up to enter the working mode to receive the valid data. After the valid data is received, the local device is controlled to enter the CAD mode of the next period, so as to detect a next preamble, and continue to periodically switch between the CAD mode and the low power mode.

In an embodiment, a preamble may be divided into groups each including m symbols. In this way, each data group (that is, a segment spacing symbol, a destination address coding symbol, a first duration coding symbol, and a second duration coding symbol) in the same preamble segment may each include m symbols, where m meets:

$$2^m > \frac{n_{preamble}}{m}. \quad n_{preamble}$$

is a total length of the preamble, and the unit is symbol. This condition ensures that a size of a binary digit formed by m bits of symbols can exceed a total of $$\frac{n_{preamble}}{m}$$

segments of preambles, so as to avoid a case in which coding fails because a data value in a preamble segment is too large.

It may be understood that, to ensure that the computer device can receive a preamble when periodically waking up (that is, periodically switching to the CAD mode), so that the destination device can successfully receive valid data, it needs to be ensured that total duration $T_{preamble}$ for transmitting the preamble (that is, total duration required for transmitting all preamble segments) is greater than periodic dormant duration $T_{T\ dorm}$ of the computer device (that is, duration in the low power mode in one period), where dorm means dormant. The periodic dormant duration $T_{dorm}$ is preset based on an actual requirement. Therefore, after the periodic dormant duration $T_{dorm}$ is determined, the total duration $T_{preamble}$ may be determined based on a principle $T_{preamble}$ being greater than $T_{dorm}$. In addition, duration $T_{symbol}$ for transmitting each symbol in the preamble is determined based on a spread spectrum factor and a transmission bandwidth. Therefore, in a case in which the spread spectrum factor and the transmission bandwidth are determined, $T_{symbol}$ may also be determined. Therefore, based on the determined total duration $T_{preamble}$ required for transmitting the preamble and the duration $T_{symbol}$ used for transmitting each symbol, a total coding length $n_{preamble}$ of the preamble may be determined. Further, based on the determined total coding length $n_{preamble}$ of the preamble and the condition $$2^m > \frac{n_{preamble}}{m},$$

a value of m may be determined, that is, a quantity of symbols in each group into which the preamble is divided is determined.

In an embodiment, formulas for calculating total duration required for transmitting the preamble are as follows:

$$T_{preamble} = (n_{preamble} + 4.25) \times T_{symbol}; \quad \text{formula (1)}$$

$$T_{symbol} = \frac{2^{SF} + 32}{BW}; \quad \text{formula (2)}$$

where $T_{Preamble}$ is the total duration required for transmitting the preamble, $n_{preamble}$ is the total length of the preamble (that is, the total length of all preamble segments), and a unit is symbol; $T_{symbol}$ is the duration used for transmitting each symbol; and SF is the spread spectrum factor, and BW is the transmission bandwidth.

It may be understood that, when the preamble is compiled, a length of the preamble needs to be slightly greater than a dormant period of the device, so as to ensure that the device can receive the preamble when waking up periodically, thereby successfully receiving the valid data. Based on this principle, $T_{preamble}=(n_{preamble}+4.25)\times T_{symbol}>T_{dorm}$ needs to be met, where $T_{dorm}$ is periodic dormant duration of the computer device.

For ease of understanding, length calculation of the preamble is first described with reference to a specific embodiment. In the LoRa technology, the spread spectrum factor may be selected from 7 to 12. A smaller spread spectrum factor indicates a shorter transmission time. To reduce energy consumption, the spread spectrum factor may be selected as 7. The bandwidth may be selected as 125 kHz, 250 kHz, or 500 kHz. The least energy is consumed in 125 kHz. Therefore, the bandwidth can be selected as 125 kHz.

SF=7 and BW=125 kHz are substituted into formula (2) to calculate the duration used for transmitting each symbol $$T_{symbol} = \frac{2^7 + 32}{125\ \text{kHz}} = 1.28\ \text{ms}.$$

For convenience of calculation, it is assumed that the computer device for receiving the preamble periodically wakes up for 2 ms every 1026 ms, and then 1026 ms−2 ms=1024 ms is the periodic dormant duration $T_{dorm}$. First, it is assumed that $T_{preamble}=1024$ ms is substituted into formula (1) $T_{preamble}=1024$ ms=$(n_{preamble}+4.25)\times 1.28$ ms, to calculate $n_{preamble}\approx 795.75$ symbol. However, $T_{preamble}$ needs to be greater than $T_{dorm}$ that is, it needs to be greater than 1024 ms. Therefore, the total coding length $n_{preamble}$ of the preamble needs to be greater than 795.75 symbols, for example, may be $n_{preamble}=800$ symbol.

Figure 8:
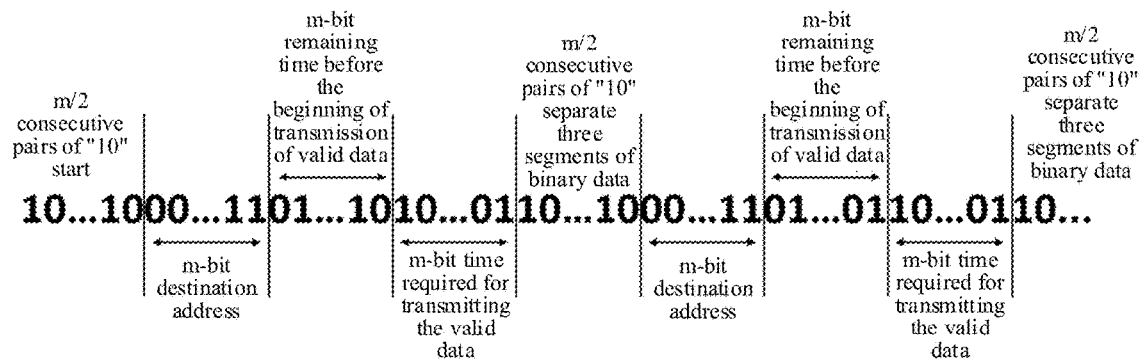
FIG. 8 is a schematic diagram of coding of a preamble according to an embodiment.

FIG. 8 is a schematic diagram of coding of a preamble according to an embodiment. Referring to FIG. 8, a segment spacing symbol includes m/2 "10" pairs, followed by three groups of binary digits each having a length of m bits, and each group of binary digits sequentially represents an m-bit destination address, an m-bit remaining time before the beginning of transmission of valid data (that is, first duration), and an m-bit time required for transmitting the valid data (that is, second duration). Then, m/2 consecutive "10" pairs are subsequently used as a segment spacing symbol, and data in a previous preamble segment is separated from following three groups of binary data. By analogy, until the entire preamble is coded.

It may be understood that a worst case may exist, that is, when a computer device wakes up (that is, enters a CAD mode), some coding symbol pairs in the segment spacing symbol are missed. Consequently, a quantity of received coding symbol pairs does not meet a preset quantity, and none of subsequent data groups of the code symbol pair includes the coding symbol pairs, or a quantity of included coding symbol pairs still does not meet the required preset quantity. In this case, to ensure that the computer device can still receive a subsequent preamble segment or valid data in the worst case, it needs to be ensured that when a coding symbol pair is received, the computer device is still in the CAD mode after receiving subsequent 3*m/2 pairs of coding symbols (that is, 3 m symbols). That is, duration in which the computer device is in the CAD mode needs to exceed duration for receiving 3*m/2 pairs of coding symbols.

Figure 9:
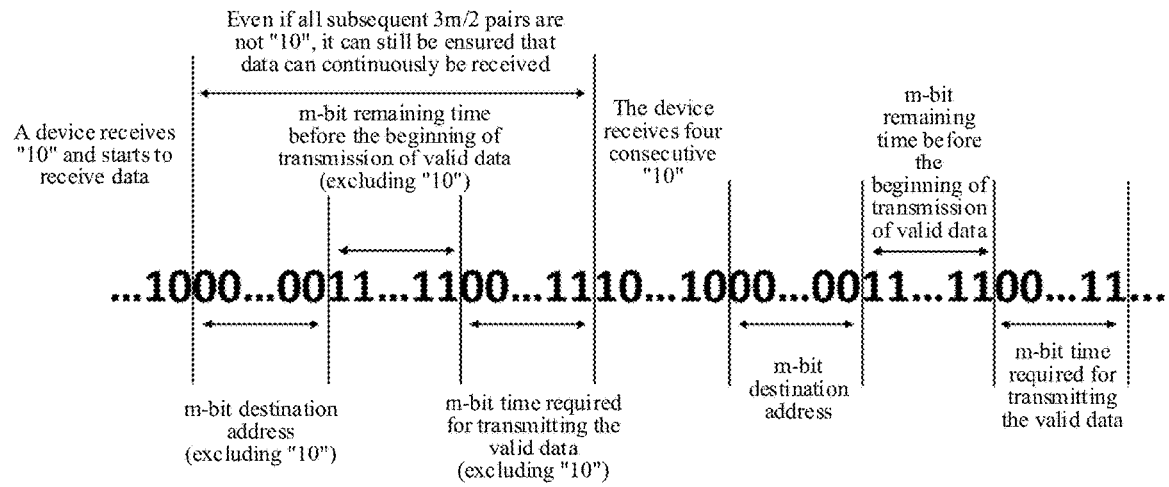
FIG. 9 is a schematic diagram of coding of a preamble according to another embodiment.

FIG. 9 is a schematic diagram of coding of a preamble according to an embodiment. Referring to FIG. 9, a computer device needs to receive m consecutive coding symbol pairs "10" before recording a subsequent data group. When the device receives one coding symbol pair "10", the following 3m*2 pairs of coding symbols are not to be recorded. Therefore, it needs to be ensured that a subsequent preamble segment can still be received even if none of the subsequent 3m*2 pairs of coding symbols are "10" pairs. That is, after the subsequent 3m*2 pairs of coding symbols are received, the computer device is still in a CAD mode. In this way, a subsequent m-bit destination address (that is, the initial data group) can be recorded after four consecutive coding symbol pairs "10" are received. If it is determined that valid data is to be transmitted to the computer device, the computer device may record an m-bit coding symbol of a remaining time before the beginning of transmission of the valid data (that is, a first duration coding symbol), and enter a low power mode. If it is determined that the valid data is not to be transmitted to the computer device, the computer device may record the m-bit coding symbol of the remaining time before the beginning of transmission of the valid data and an m-bit time required for transmitting the valid data (that is, a second duration coding symbol), and enter the low power mode according to the sum of the remaining time before the beginning of transmission of the valid data and the time required for transmitting the valid data (that is, the sum of first duration and second duration).

Figure 10:
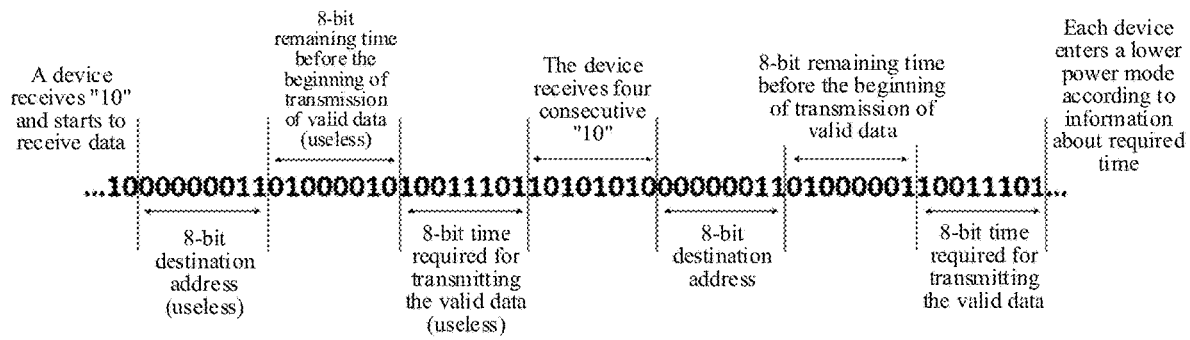
FIG. 10 shows energy consumption in a worst case according to an embodiment.

FIG. 10 shows energy consumption in a worst case according to an embodiment. Referring to FIG. 10, data before a device receives four consecutive coding symbol pairs "10" is useless data. After receiving four consecutive "10", the device records a destination address coding symbol and determines whether the device is a destination device, and selectively records subsequent data according to a determining result.

A specific example is used for describing the data receiving method in the present disclosure, which can reduce energy consumption of a computer device.

If there are 101 receiving devices, it is assumed that valid data has 2464 symbols, a total coding length of a preamble is 800 symbols, and duration $T_{symbol}$ used for transmitting each symbol is 1.28 ms. It is assumed that, in a method compared with the data receiving method in the present disclosure, a preamble segment includes three groups of data: a segment spacing symbol, a destination address coding symbol, and a first duration coding symbol. In the solution of the present disclosure, the preamble segment includes four groups of data: a segment spacing symbol, a destination address coding symbol, a first duration coding symbol, and a second duration coding symbol. Each group of data is acquired by coding an 8-bit symbol. The segment spacing symbol includes four consecutive coding symbol pairs "10".

In this case, for the comparison method and the solution of the present disclosure, in a start phase, all devices receive the first bit preamble, and start to enter a CAD mode. After detecting four consecutive pairs of "10", the devices continue to detect an 8-bit destination address. If one of the devices determines that valid data is to be transmitted to the device, the device may detect an 8-bit first duration coding symbol, set a timer based on the 8-bit first duration coding symbol, enter a low power mode, wait for the timer to wake up itself to receive the valid data, and then enter the CAD mode to continue to detect whether there is a preamble after receiving the valid data. If no preamble exists, the device enters a periodic dormant mode (that is, periodically switches between the low power mode and the CAD mode). A difference lies in that, according to the comparison method, after determining that they are non-destination devices, all the non-destination devices continue to enter periodic dormant. In this case, cumulative energy consumption generated by all the devices to maintain the CAD mode is:

24 symbols*1.28 ms/symbol+16 symbols*1.28 ms/symbol*100*(2464 symbols+800 symbols)/(8 symbols+8 symbols+800 symbols)=8222.72 ms. According to the solution of the present disclosure, after determining, according to the 8-bit destination address, that they are non-destination devices, all the non-destination devices separately detect an 8-bit first duration coding symbol and an 8-bit second duration coding symbol, calculate the sum of the first duration and the second duration, then set a timer, and enter the low power mode. After being woken up by the timer, the devices continue to detect whether there is a preamble in the CAD mode. If no preamble exists, the devices enter the periodic dormant mode. In this case, cumulative energy consumption generated by all the devices to maintain the CAD mode is 24 symbols*1.28 ms/symbol+32 symbols*1.28 ms/symbol*100=4126.72 ms.

Clearly, 4126.72 ms is far lower than 8222.72 ms. Therefore, energy consumption of the computer device can be reduced by using the solution in this embodiment of the present disclosure.

Figure 11:
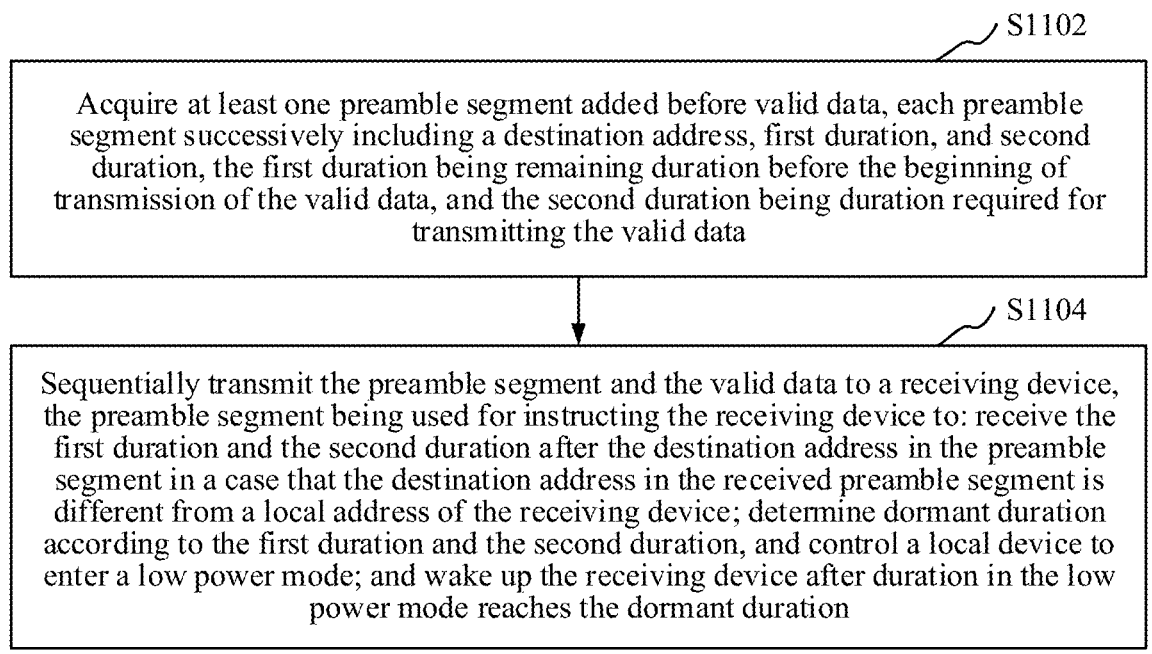
FIG. 11 is a schematic flowchart of a data transmitting method according to an embodiment.

As shown in FIG. 11, an embodiment provides a data transmitting method. The data transmitting method in this embodiment may be applied to a computer device. Currently, the transmitter 110 in FIG. 1 is mainly used as an example for description. Referring to FIG. 11, the method includes the following steps:

S1102. Acquire at least one preamble segment added before valid data, each preamble segment sequentially including a destination address, first duration, and second duration, the first duration being remaining duration before the beginning of transmission of the valid data, and the second duration being duration required for transmitting the valid data.

S1104. Sequentially transmit the preamble segment and the valid data to a receiving device, the preamble segment being used for instructing the receiving device to: receive the first duration and the second duration after the destination address in the preamble segment when the destination address in the received preamble segment is different from a local address of the receiving device; determine dormant duration according to the first duration and the second duration, and control a local device to enter a low power mode; and wake up the receiving device after duration in the low power mode reaches the dormant duration.

In the foregoing data transmitting method, the preamble segment sequentially includes the destination address, the first duration, and the second duration, and the preamble segment and the valid data are sequentially transmitted to the receiving device, so that after determining, according to the destination address, that the local device is not a destination device, the receiving device controls, according to the first duration and the second duration in the preamble segment before the valid data is fully transmitted to the destination device, the local device to be always in the low power mode until duration in the low power mode reaches the dormant duration, and then the local device is woken up. Therefore, the local device does not need to continue to wake up periodically, thereby avoiding and reducing energy consumption caused by periodically waking up to enter a CAD mode.

In an embodiment, the preamble segment is further used for instructing the receiving device to: control, when the destination address in the received preamble segment is the same as the local address of the receiving device, the local device to enter the low power mode after the first duration in the preamble segment is received; and wake up, when the duration in the low power mode reaches the first duration, the receiving device to receive the transmitted valid data.

In an embodiment, each preamble segment sequentially includes a segment spacing symbol, a destination address coding symbol, a first duration coding symbol, and a second duration coding symbol. The segment spacing symbol is used for separating a preamble segment in which the segment spacing symbol is located from a previous preamble segment.

In an embodiment, the segment spacing symbol, the destination address coding symbol, the first duration coding symbol, and the second duration coding symbol are data groups with the same symbol quantity. The segment spacing symbol includes a preset quantity of consecutive coding symbol pairs; and the preamble segment is further used for instructing the receiving device to: record, when the preset quantity of consecutive coding symbol pairs are received, the initial data group after the last coding symbol pair to acquire the destination address coding symbol; and decode the destination address coding symbol to acquire the destination address.

Figure 12:
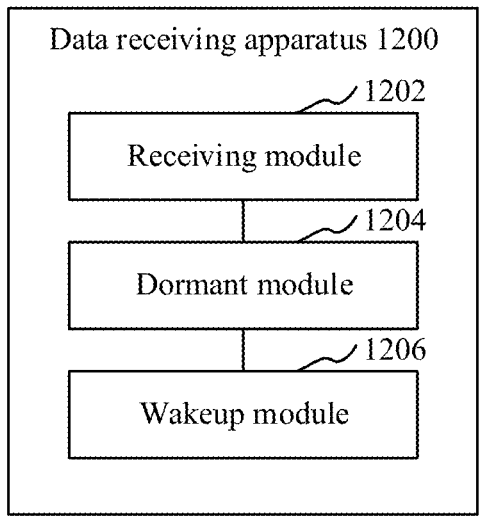
FIG. 12 is a block diagram of a data receiving apparatus according to an embodiment.

As shown in FIG. 12, in an embodiment, a data receiving apparatus 1200 is provided, and is disposed in the computer device in the foregoing embodiment. The apparatus 1200 includes a receiving module 1202, a dormant module 1204, and a wakeup module 1206.

The receiving module 1202 is configured to receive a destination address in a preamble segment; and receive first duration and second duration after the destination address in the preamble segment when the destination address is different from a local address, the first duration being remaining duration before the beginning of transmission of valid data, and the second duration being duration required for transmitting the valid data.

The dormant module 1204 is configured to: determine dormant duration according to the first duration and the second duration, and control the local device to enter a low power mode.

The wakeup module 1206 is configured to wake up the local device after duration in the low power mode reaches the dormant duration.

In an embodiment, the dormant module 1204 is further configured to: control, when the destination address is the same as the local address, the local device to enter the low power mode in response to receiving the first duration, second duration being after first duration in the same preamble segment; and the wakeup module 1206 is further configured to wake up, when the duration in the low power mode reaches the first duration, the local device to receive the valid data transmitted after the preamble segment.

In an embodiment, the receiving module 1202 is further configured to receive the destination address in the preamble segment in a CAD mode; and the wakeup module 1206 is further configured to: wake up, when the duration in the low power mode reaches the first duration, the local device to enter a working mode to receive the valid data transmitted after the preamble segment.

In an embodiment, the receiving module 1202 is further configured to receive the destination address in the preamble segment in a CAD mode of a current period, the same period including a CAD mode and a low power mode; and the wakeup module 1206 is further configured to: enter, when the destination address is different from the local address, a CAD mode of a next period after the local device is woken up; and enter, when the destination address is the same as the local address, the CAD mode of the next period after the valid data is successfully transmitted to the local device.

In an embodiment, the preamble segment is a segment in a preamble; the preamble includes a plurality of consecutive preamble segments; each preamble segment sequentially includes a segment spacing symbol, a destination address coding symbol, a first duration coding symbol, and a second duration coding symbol; and the segment spacing symbol is used for separating a preamble segment in which the segment spacing symbol is located from a previous preamble segment.

In an embodiment, the receiving module 1202 is further configured to: record, starting from a coding symbol next to the segment spacing symbol when the segment spacing symbol is received, a coding symbol that meets a preset symbol quantity, to acquire a destination address coding symbol; and decode the destination address coding symbol to acquire the destination address in the preamble segment.

In an embodiment, the segment spacing symbol, the destination address coding symbol, the first duration coding symbol, and the second duration coding symbol are data groups with the same symbol quantity; the segment spacing symbol includes a preset quantity of consecutive coding symbol pairs; and the receiving module 1202 is further configured to: record, when the preset quantity of consecutive coding symbol pairs are received, the initial data group after the last coding symbol pair to acquire a destination address coding symbol.

In an embodiment, both the local device and a destination device are IoT devices; the valid data is instruction data used for controlling the IoT device; and the preamble segment is data before the valid data.

Figure 13:
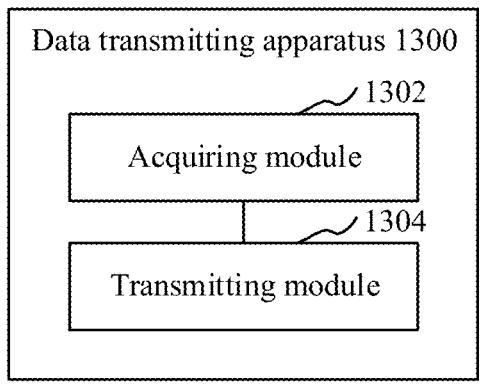
FIG. 13 is a block diagram of a data transmitting apparatus according to an embodiment.

As shown in FIG. 13, in an embodiment, a data transmitting apparatus 1300 is provided, and is disposed in a transmitter. The apparatus 1300 includes an acquiring module 1302 and a transmitting module 1304.

The acquiring module 1302 is configured to acquire at least one preamble segment added before valid data, each preamble segment sequentially including a destination address, first duration, and second duration, the first duration being remaining duration before the beginning of transmission of the valid data, and the second duration being duration required for transmitting the valid data.

The transmitting module 1304 is configured to sequentially transmit the preamble segment and the valid data to a receiving device, the preamble segment being used for instructing the receiving device to: receive the first duration and the second duration after the destination address in the preamble segment when the destination address in the received preamble segment is different from a local address of the receiving device; determine dormant duration according to the first duration and the second duration, and control a local device to enter a low power mode; and wake up the receiving device after duration in the low power mode reaches the dormant duration.

In an embodiment, the preamble segment is further used for instructing the receiving device to: control, when the destination address in the received preamble segment is the same as the local address of the receiving device, the local device to enter the low power mode after the first duration in the preamble segment is received; and wake up, when the duration in the low power mode reaches the first duration, the receiving device to receive the transmitted valid data.

In an embodiment, each preamble segment sequentially includes a segment spacing symbol, a destination address coding symbol, a first duration coding symbol, and a second duration coding symbol; and the segment spacing symbol is used for separating a preamble segment in which the segment spacing symbol is located from a previous preamble segment.

In an embodiment, the segment spacing symbol, the destination address coding symbol, the first duration coding symbol, and the second duration coding symbol are data groups with the same symbol quantity. The segment spacing symbol includes a preset quantity of consecutive coding symbol pairs; and the preamble segment is further used for instructing the receiving device to: record, when the preset quantity of consecutive coding symbol pairs are received, the initial data group after the last coding symbol pair to acquire the destination address coding symbol; and decode the destination address coding symbol to acquire the destination address.

For a specific definition of the data receiving apparatus and the data transmitting apparatus, refer to the foregoing definition of the data receiving method and the data transmitting method. Details are not described herein again. All or some of the modules in the foregoing data receiving apparatus and the data transmitting apparatus may be implemented by using software, hardware, and a combination thereof. The foregoing modules may be embedded in or independent of a processor in the computer device in a hardware form, or may be stored in a memory in the computer device in a software form, so that the processor invokes the software to execute operations corresponding to the foregoing modules.

Figure 14:
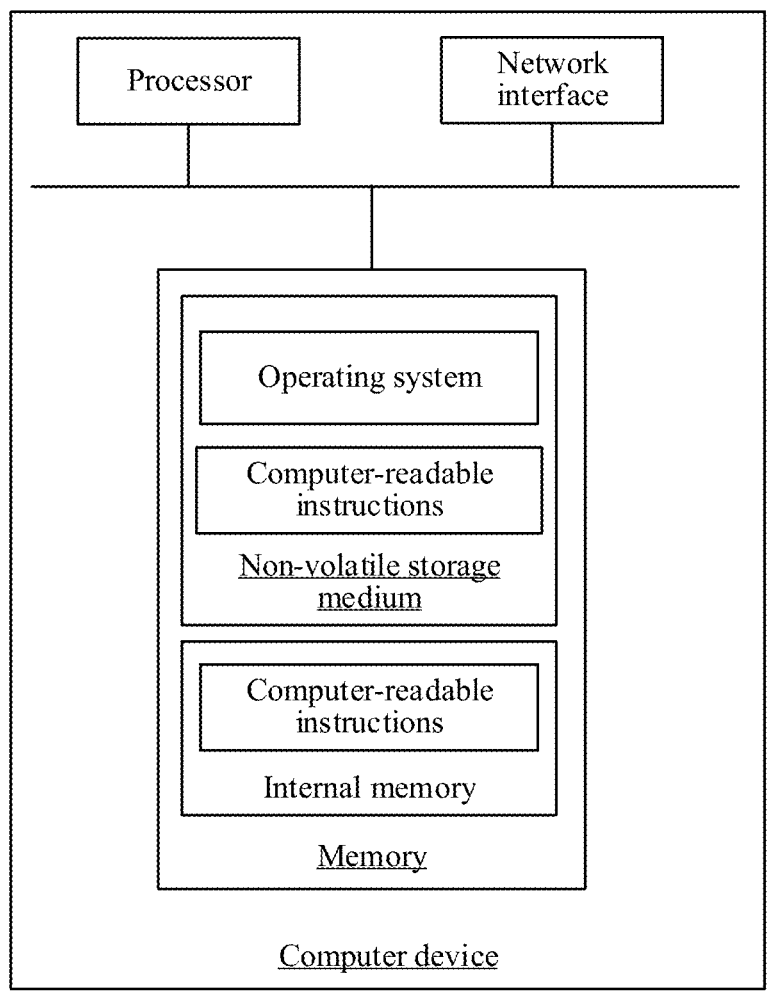
FIG. 14 is a block diagram of a computer device according to an embodiment.

FIG. 14 is a block diagram of a computer device according to an embodiment. Referring to FIG. 14, the computer device may be the computer device 120 or the transmitter 110 in FIG. 1. The computer device includes a processor, a memory, and a network interface that are connected by using a system bus. The memory includes a non-volatile storage medium and an internal memory. The non-volatile storage medium of the computer device may store an operating system and computer-readable instructions. When the computer-readable instructions are executed, the processor may perform a data receiving method or a data transmitting method. The processor of the computer device is configured to provide a computing and control capability to support running of the entire computer device. The internal memory may store computer-readable instructions. When the computer-readable instructions are executed by the processor, the processor may perform a data receiving method or a data transmitting method. The network interface of the computer device is configured to perform network communication.

A person skilled in the art may understand that the structure shown in FIG. 14 is merely a block diagram of a partial structure related to the solutions of the present disclosure, and does not constitute a limitation on the computer device to which the solutions of the present disclosure are applied. A specific computer device may include more or fewer components than those shown in the figure, or combine some components, or have different component arrangements.

In an embodiment, the data receiving apparatus or the data transmitting apparatus provided in the present disclosure may be implemented in a form of computer-readable instructions. The computer-readable instructions may run on the computer device shown in FIG. 14. The non-volatile storage medium of the computer device may store program modules constituting the data receiving apparatus or the data transmitting apparatus, for example, the receiving module 1202, the dormant module 1204, and the wakeup module 1206 shown in FIG. 12; or the acquiring module 1302 and the transmitting module 1304 shown in FIG. 13. The computer-readable instructions formed by the program modules are used for enabling the computer device to perform the steps in the data receiving method or the data transmitting method in the embodiments of the present disclosure described in this specification.

For example, the computer device may receive a destination address in a preamble segment by using the receiving module 1202 in the data receiving apparatus 1200 shown in FIG. 12. The computer device may receive first duration and second duration after the destination address in the preamble segment when the destination address is different from a local address, the first duration being remaining duration before the beginning of transmission of valid data, and the second duration being duration required for transmitting the valid data. The computer device may determine dormant duration according to the first duration and the second duration by using the dormant module 1204, and control the local device to enter a low power mode. The computer device may wake up the local device by using the wakeup module 1206 after duration in the low power mode reaches the dormant duration.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

For another example, the computer device may acquire, by using the acquiring module 1302 in the data transmitting apparatus 1300 shown in FIG. 13, at least one preamble segment added before valid data, each preamble segment sequentially including a destination address, first duration, and second duration, the first duration being remaining duration before the beginning of transmission of the valid data, and the second duration being duration required for transmitting the valid data. The computer device may sequentially transmit, by using the transmitting module 1304, the preamble segment and the valid data to a receiving device, the preamble segment being used for instructing the receiving device to: receive the first duration and the second duration after the destination address in the preamble segment when the destination address in the received preamble segment is different from a local address of the receiving device; determine dormant duration according to the first duration and the second duration, and control the local device of the receiving device to enter a low power mode; and wake up the receiving device after duration in the low power mode reaches the dormant duration.

In an embodiment, a computer device is provided, including a memory and one or more processors, where the memory stores computer-readable instructions, and when the computer-readable instructions are executed by one or more processors, the one or more processors perform the steps of the foregoing data receiving method or data transmitting method. The steps of the data receiving method or the data transmitting method herein may be the steps of the data receiving method or the data transmitting method in the foregoing embodiments.

In an embodiment, one or more computer-readable storage media are provided, and store computer-readable instructions. When the computer-readable instructions are executed by one or more processors, the one or more processors perform the steps of the foregoing data receiving method or data transmitting method. The steps of the data receiving method or the data transmitting method herein may be the steps of the data receiving method or the data transmitting method in the foregoing embodiments.

"First", "second", and the like in the embodiments of the present disclosure are merely used for distinguishing, but are not used for limitation on a size, a sequence, a dependency, or the like.

It is to be understood that although the steps in the embodiments of the present disclosure are not necessarily performed sequentially in a sequence indicated by step numbers. Unless clearly specified in this specification, there is no strict sequence limitation on the execution of the steps, and the steps may be performed in another sequence. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed in turn or alternately with other steps or at least some of sub-steps or stages of other steps.

A person of ordinary skill in the art may understand that all or some of the procedures of the methods in the foregoing embodiments may be implemented by computer-readable instructions instructing relevant hardware. The program may be stored in a non-volatile computer-readable storage medium. When the program runs, the procedures of the foregoing method embodiments are performed. Any reference to a memory, a storage, a database, or another medium used in the various embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of the present disclosure specifically and in detail, but cannot be construed as a limitation to the patent scope of the present disclosure. For a person of ordinary skill in the art, several transformations and improvements can be made without departing from the idea of the present disclosure. These transformations and improvements belong to the protection scope of the present disclosure. Therefore, the protection scope of the present disclosure is subject to the protection scope of the appended claims.

What is claimed is:

1. A data receiving method, performed by a computer device, the method comprising:
   receiving a destination address in a preamble segment, wherein the preamble segment comprises a destination address coding symbol, a first duration coding symbol, and a second duration coding symbol arranged after the first duration coding symbol;
   receiving a first duration and a second duration after the destination address in the preamble segment when the destination address is different from a local address, comprising:
      recording, starting from a next coding symbol of a last symbol of the first duration coding symbol, a coding symbol that meets a symbol quantity corresponding to the second duration, to acquire the second duration coding symbol, and decoding the second duration coding symbol to acquire the second duration, the first duration being a remaining duration before a beginning of transmission of valid data, and the second duration being a duration required for transmitting the valid data;
   determining a dormant duration according to the first duration and the second duration, and controlling a local device to enter a low power mode; and
   waking up the local device after a duration in the low power mode reaches the dormant duration.

2. The method according to claim 1, further comprising:
   controlling, when the destination address is the same as the local address, the local device to enter the low power mode in response to receiving the first duration; and
   waking up, when the duration in the low power mode reaches the first duration, the local device to receive the valid data transmitted after the preamble segment.

3. The method according to claim 2, wherein the receiving a destination address in a preamble segment comprises:
   receiving the destination address in the preamble segment in a channel activity detection (CAD) mode; and
   the waking up, when the duration in the low power mode reaches the first duration, the local device to receive the valid data transmitted after the preamble segment comprises:
      waking up, when the duration in the low power mode reaches the first duration, the local device to enter a working mode to receive the valid data transmitted after the preamble segment.

4. The method according to claim 3, wherein the receiving the destination address in the preamble segment in a CAD mode comprises:
   receiving the destination address in the preamble segment in a CAD mode of a current period, wherein one period comprises a subperiod corresponding to the CAD mode and a subperiod corresponding to the low power mode; and the method further comprises:
- entering, when the destination address is different from the local address, the CAD mode of a next period after the local device is woken up; and
- entering, when the destination address is the same as the local address, the CAD mode of the next period after the valid data is successfully transmitted to the local device.

5. The method according to claim 1, wherein the preamble segment is a segment in a preamble; the preamble comprises a plurality of consecutive preamble segments; each preamble segment comprises a segment spacing symbol, the destination address coding symbol, the first duration coding symbol, and the second duration coding symbol arranged in sequence; and the segment spacing symbol is configured to separate a preamble segment in which the segment spacing symbol is located from a preceding preamble segment.

6. The method according to claim 1, wherein the preamble segment further comprises a segment spacing symbol arranged before the destination address coding symbol, and the receiving a destination address in a preamble segment comprises:
- recording, starting from a coding symbol next to the segment spacing symbol when the segment spacing symbol is received, a coding symbol that meets a preset symbol quantity, to acquire the destination address coding symbol; and
- decoding the destination address coding symbol to acquire the destination address in the preamble segment.

7. The method according to claim 6, wherein the segment spacing symbol, the destination address coding symbol, the first duration coding symbol, and the second duration coding symbol are data groups with a same symbol quantity; and the segment spacing symbol comprises a preset quantity of consecutive coding symbol pairs; and
- the recording, starting from a coding symbol next to the segment spacing symbol when the segment spacing symbol is received, a coding symbol that meets a preset symbol quantity, to acquire a destination address coding symbol comprises:
  - recording, when the preset quantity of consecutive coding symbol pairs are received, an initial data group after a latest coding symbol pair to acquire the destination address coding symbol.

8. The method according to claim 7, wherein the receiving a first duration and a second duration after the destination address in the preamble segment comprises:
- recording two data groups after the initial data group; and
- decoding the first duration coding symbol and the second duration coding symbol in the two data groups to acquire the first duration and the second duration.

9. The method according to claim 1, wherein both the local device and a destination device corresponding to the destination address are Internet of Things (IoT) devices; the valid data is instruction data configured to control at least one of the IoT devices; and the preamble segment is data before the valid data.

10. The method according to claim 2, further comprising:
- controlling, when the destination address is the same as the local address, the local device to enter the low power mode in response to receiving the first duration and stop receiving the second duration coding symbol in the preamble segment.

11. The method according to claim 1, wherein determining the dormant duration comprises:
- determining a sum of the first duration and the second duration as the dormant duration is when the destination address is different from the local address, and
- determining the first duration as the dormant duration when the destination address is the same as the local address.

12. A data receiving apparatus, comprising at least one memory and at least one processor, the at least one memory storing computer-readable instructions, when executed by the at least one processor, causing the at least one processor to:
- receive a destination address in a preamble segment, the preamble segment being located before valid data, wherein the preamble segment comprises a destination address coding symbol, a first duration coding symbol, and a second duration coding symbol arranged after the first duration coding symbol;
- receive a first duration and a second duration after the destination address in the preamble segment when the destination address is different from a local address, comprising:
  - recording, starting from a next coding symbol of a last symbol of the first duration coding symbol, a coding symbol that meets a symbol quantity corresponding to the second duration, to acquire the second duration coding symbol, and decoding the second duration coding symbol to acquire the second duration, the first duration being a remaining duration before a beginning of transmission of valid data, and the second duration being a duration required for transmitting the valid data;
- determine a dormant duration according to the first duration and the second duration, and control a local device to enter a low power mode; and
- wake up the local device after a duration in the low power mode reaches the dormant duration.

13. The apparatus according to claim 12, wherein the at least one processor is further configured to:
- control, when the destination address is the same as the local address, the local device to enter the low power mode in response to receiving the first duration; and
- wake up, when the duration in the low power mode reaches the first duration, the local device to receive the valid data transmitted after the preamble segment.

14. The apparatus according to claim 13, wherein the at least one processor is further configured to:
- receive the destination address in the preamble segment in a CAD mode; and
- wake up, when the duration in the low power mode reaches the first duration, the local device to enter a working mode to receive the valid data transmitted after the preamble segment.

15. The apparatus according to claim 14, wherein the at least one processor is further configured to:
- receive the destination address in the preamble segment in a CAD mode of a current period, wherein one period comprises a subperiod corresponding to the CAD mode and a subperiod corresponding to the low power mode;
- enter, when the destination address is different from the local address, a CAD mode of a next period after the local device is woken up; and
- enter, when the destination address is the same as the local address, the CAD mode of the next period after the valid data is successfully transmitted to the local device.

16. The apparatus according to claim 12, wherein the preamble segment is a segment in a preamble; the preamble comprises a plurality of consecutive preamble segments; each preamble segment comprises a segment spacing symbol the a destination address coding symbol, the first duration coding symbol, and the second duration coding symbol arranged in sequence; and the segment spacing symbol is configured to separate a preamble segment in which the segment spacing symbol is located from a preceding preamble segment.

17. The apparatus according to claim 10, wherein the preamble segment further comprises a segment spacing symbol arranged before the destination address coding symbol, and the at least one processor is further configured to:
  record, starting from a coding symbol next to the segment spacing symbol when the segment spacing symbol is received, a coding symbol that meets a preset symbol quantity, to acquire the destination address coding symbol; and
  decode the destination address coding symbol to acquire the destination address in the preamble segment.

18. The apparatus according to claim 17, wherein the segment spacing symbol, the destination address coding symbol, the first duration coding symbol, and the second duration coding symbol are data groups with a same symbol quantity; and the segment spacing symbol comprises a preset quantity of consecutive coding symbol pairs; and
  the at least one processor is further configured to record, when the preset quantity of consecutive coding symbol pairs are received, an initial data group after a latest coding symbol pair to acquire the destination address coding symbol.

19. The apparatus according to claim 18, wherein the at least one processor is further configured to:
  record two data groups after the initial data group; and
  decode the first duration coding symbol and the second duration coding symbol in the two data groups to acquire the first duration and the second duration.

20. One or more non-transitory computer-readable storage media, storing computer-readable instructions, when executed by one or more processors, causing the one or more processors to perform:
  receiving a destination address in a preamble segment, wherein the preamble segment comprises a destination address coding symbol, a first duration coding symbol, and a second duration coding symbol arranged after the first duration coding symbol;
  receiving a first duration and a second duration after the destination address in the preamble segment when the destination address is different from a local address, comprising:
    recording, starting from a next coding symbol of a last symbol of the first duration coding symbol, a coding symbol that meets a symbol quantity corresponding to the second duration, to acquire the second duration coding symbol, and decoding the second duration coding symbol to acquire the second duration, the first duration being a remaining duration before a beginning of transmission of valid data, and the second duration being a duration required for transmitting the valid data;
  determining a dormant duration according to the first duration and the second duration, and controlling a local device to enter a low power mode; and
  waking up the local device after a duration in the low power mode reaches the dormant duration.

\* \* \* \* \*